US007627289B2

(12) United States Patent

Huddart

(10) Patent No.: US 7,627,289 B2
(45) Date of Patent: Dec. 1, 2009

(54) WIRELESS STEREO HEADSET

(75) Inventor: David Huddart, Westbury-on-Trym (GB)

(73) Assignee: Plantronics, Inc., Santa Cruz, CA (US)

( * ) Notice: Subject to any disclaimer, the term of this patent is extended or adjusted under 35 U.S.C. 154(b) by 517 days.

(21) Appl. No.: 11/317,984

(22) Filed: Dec. 23, 2005

(65) Prior Publication Data

US 2007/0149261 A1 Jun. 28, 2007

(51) Int. Cl.
*H04B 7/00* (2006.01)

(52) U.S. Cl. ................ 455/41.2; 455/575.2; 455/343.1; 455/41.3

(58) Field of Classification Search .............. 455/575.2, 455/343.1–343.6, 41.1–41.3; 381/380, 376, 381/367; 379/428.02
See application file for complete search history.

(56) References Cited

U.S. PATENT DOCUMENTS 5,086,464 A * 2/1992 Groppe ........................ 381/380
6,134,420 A * 10/2000 Flowerdew et al. ........ 455/41.1
6,320,959 B1 * 11/2001 Crouch et al. ............... 379/430
6,381,308 B1 * 4/2002 Cargo et al. ............ 379/428.02
7,089,434 B2 * 8/2006 Kuo ........................... 713/300
7,103,344 B2 * 9/2006 Menard ................... 455/343.2
7,215,924 B2 * 5/2007 Palermo et al. ............ 455/41.1
7,333,838 B2 * 2/2008 Pattabiraman et al. ...... 455/574
2002/0132585 A1 * 9/2002 Palermo et al. ............... 455/41
2003/0073460 A1 4/2003 Van Pelt et al.
2004/0214614 A1 * 10/2004 Aman ..................... 455/569.1
2005/0037823 A1 * 2/2005 Seshadri et al. .......... 455/575.6
2005/0164636 A1 * 7/2005 Palermo et al. ............ 455/41.2
2006/0013432 A1 * 1/2006 Husung ...................... 381/396
2006/0251277 A1 11/2006 Cho
2007/0004464 A1 * 1/2007 Lair et al. ................ 455/569.1
2007/0037615 A1 * 2/2007 Glezerman ............... 455/575.2

FOREIGN PATENT DOCUMENTS

EP 1185138 A 3/2002
EP 1715718 A 10/2006
WO WO9852295 A 11/1998
WO WO2005099301 A 10/2005

* cited by examiner

*Primary Examiner*—Lana N Le
(74) *Attorney, Agent, or Firm*—Intellectual Property Law Office of Thomas Chuang

(57) ABSTRACT

Systems and methods for a wireless stereo headset are disclosed. The system generally includes a first headset component and a second headset component. Both the first headset component and the second headset component may be wireless devices.

20 Claims, 8 Drawing Sheets

WIRELESS STEREO HEADSET

BACKGROUND OF THE INVENTION

Conventional wireless communication headsets are monaural. As a result, many headsets utilize an "over the ear" configuration not requiring the use of a headband. However, there are certain usage scenarios in which the user of a wireless communication headset may wish to listen to a stereo signal using both ears. Such usage scenarios are expected to increase with the availability of a variety of electronic devices and multi-function devices. Such devices include cellular telephones, digital music players, personal digital assistants, and devices combining one or more of these devices into a single integrated device.

Conventional prior art stereo headsets use a headband to support the two speakers outputting the stereo channels. A headband solution implements stereo operation by using the headband to carry the electrical signals from one side of the head to the other with an electrical wire. Another prior art solution utilizes wires to conduct the electrical signals without the headband. For example, a wired earbud may extend from a wireless monaural headset.

However, the use of a headband or wires is not desired in a variety of situations. For example, users may have a personal preference against wearing a headband. The user may not wish to have any wires attached to any part of the headset or worn about the body. In certain situations, the user will wish to have a headset capable of stereo operation. However, the user also wishes to have the option of wearing only a monaural earpiece during monaural operation such as during a telephone call. The user is then required to use two different headsets—a monaural headset for telephone operation and a wireless stereo headset for stereo listening applications.

As a result, there is a need for improved methods and apparatuses for stereo headsets.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
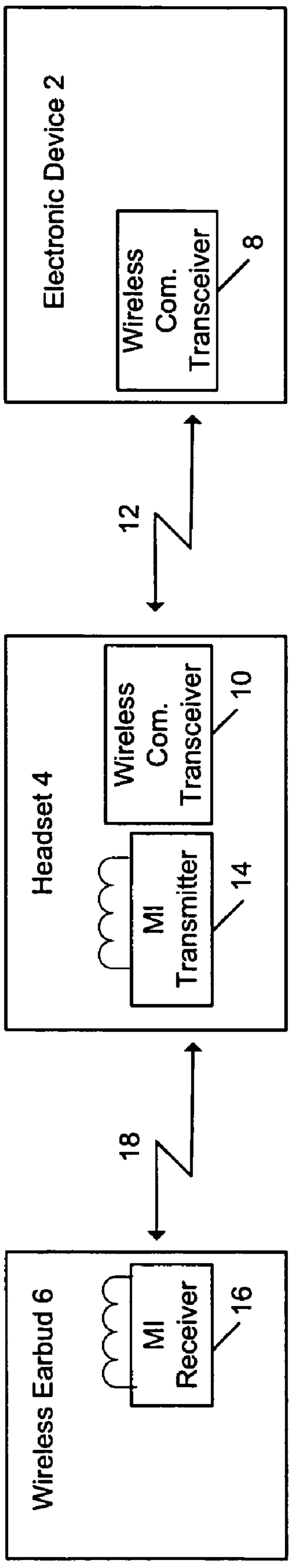
FIG. 1 illustrates a system view of a wireless stereo headset system in one example of the invention.

Methods and apparatuses for wireless stereo headsets are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Generally, this description describes a method and apparatus for a wireless stereo headset system having a headset component and a wireless earbud component. In one example, the wireless headset system has a stereo mode utilizing a wireless earbud to output one channel of a stereo signal. The invention may be utilized in conjunction with a variety of electronic devices, including cell phones, PDAs, and MP3 or other digital format players. While the present invention is not necessarily limited to such devices, various aspects of the invention may be appreciated through a discussion of various examples using this context.

According to an example of the present invention, a wireless headset includes a magnetic induction (MI) transmitter such that a wireless link may be formed with a wireless earbud containing a magnetic induction receiver. One channel of a stereo signal is transmitted from the headset to the earbud over the wireless link to enable a user to listen to the stereo signal. In one example mode of operation, the wireless headset is Bluetooth enabled and communicates with a Bluetooth enabled cellular telephone. The headset can be used in a monaural mode and switched seamlessly between monaural and stereo operational modes. For example, Bluetooth Multipoint mode may be used.

According to an example of the invention, a stereo headset system includes a first wireless component having a first speaker, a microphone, a first wireless communication module, and a second wireless communication module. The stereo headset system includes a second wireless component having a second speaker and a third wireless communication module for receiving an audio signal from the second wireless communication module during stereo mode operation.

According an example of the invention, a headset system includes an electronic device capable of outputting a monaural or a stereo audio signal, a first headset component for receiving the monaural or the stereo signal from the electronic device, and a second headset component capable of wireless communications with the first headset component. The second headset component receives the stereo signal or a component of the stereo signal from the first headset component.

FIG. 1 illustrates a system view of a wireless stereo headset system in use in one example of the invention. A headset 4 is in proximity to an electronic device 2. In one example of the invention, both headset 4 and electronic device 2 have wireless communication functionality to implement wireless communications there between over a wireless communication link 12. Electronic device 2 includes a wireless communication transceiver 8 and headset 4 includes a wireless communication transceiver 10. In a further example, headset 4 and electronic device 2 may communicate via a wired link. Although only one electronic device 2 is illustrated, headset 4 may communicate with and switch between multiple electronic devices. Electronic device 2, for example, may be any electronic device capable of transmitting data such as voice or text data to headset 4. Examples of electronic device 2 include, but are not limited to cellular telephones, digital music players, personal digital assistants, or combinations thereof. A particular electronic device 2 may output only a monaural signal or only a stereo signal. In a further example, a particular electronic device 2 may output both a monaural signal and a stereo signal, dependent upon the device mode of operation.

When stereo listening operation is desired by a user, a wireless earbud 6 is used in conjunction with headset 4. Both headset 4 and wireless earbud 6 have wireless communication functionality to form a wireless communication link 18. In one example of the invention, wireless communication link 18 is implemented using magnetic induction. Headset 4 includes a magnetic induction transmitter 14 and wireless earbud 6 includes a magnetic induction receiver 16. Although reference is made to a wireless earbud herein, any wireless device capable of receiving and outputting an audio signal into a user's ear may be utilized including, for example, over-the-ear or in-the-ear devices.

In one example of the invention, a magnetic induction wireless communication link is established between headset 4 and wireless earbud 6. Magnetic induction provides short range wireless communication at low power and cost while providing good audio signal quality. Magnetic induction allows the use of very simple analogue RF technologies to generate and receive signals. In one example, analogue FM modulation with carrier frequencies in the range 1-15 MHz is used. In further examples of the invention, AM modulation may be used, as well as various forms of digital modulation.

The use of magnetic induction is particularly advantageous. The magnetic field strength drops as a $4^{th}$ power of distance, resulting in a limited range. Interference between two or more users will be limited by the $4^{th}$ power field strength characteristic hence a single operating carrier channel will suffice. Use of FM modulation also helps due to the capture effect. Magnetic induction communication systems are discussed, for example, in U.S. Pat. No. 6,134,420 entitled "Vector Measuring Aerial Arrays for Magnetic Induction Communication Systems" and U.S. Pat. No. 6,061,030 entitled "Aerial Arrays for Magnetic Induction Communication Systems Having Limited Power Supplies", which are assigned to the present applicant Plantronics, Inc. and hereby incorporated by reference for all purposes.

The range of transmission required between the magnetic induction transmitter and magnetic induction receiver is small and is approximately between 200 and 300 mm depending on the size of the user. Due to the short range required in this application, low power operation is possible. In operation, wireless earbud 6 may automatically activate when brought in range of headset 4.

Magnetic induction generally requires the transmit and receive coils to be aligned, preferably axially. In this application alignment is automatic since the user's ears are normally axially aligned either side of the head. As a result, when the headset 4 and wireless earbud 6 are worn, the transmit and receive coils are automatically axially aligned. In further examples of the invention, other methods of wireless communication may be used to establish wireless communication link 18 between headset 4 and wireless earbud 6. For example, wireless earbud 6 may be Bluetooth enabled to communicate with either headset 4 or electronic device 2.

Figure 2:
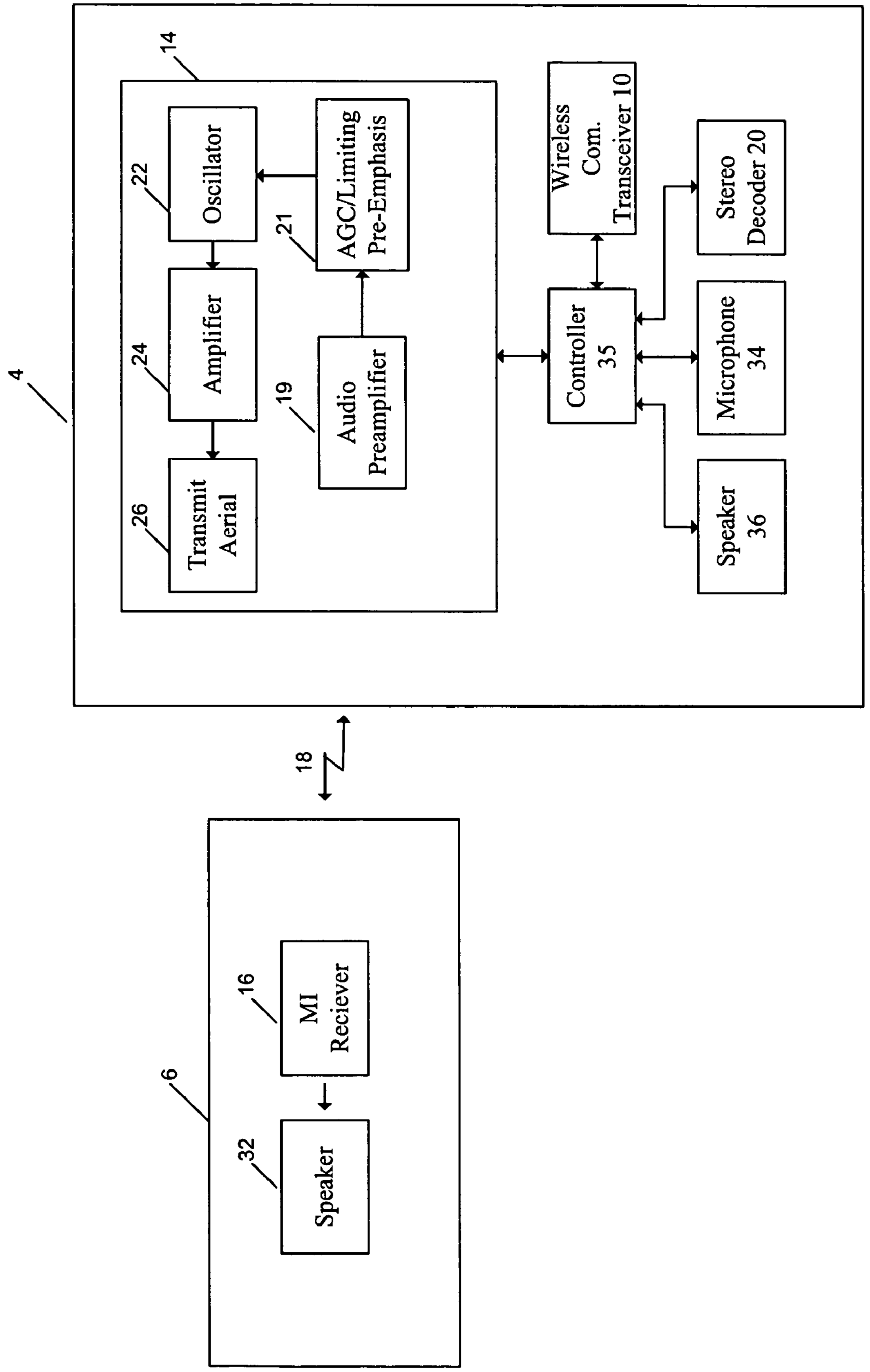
FIG. 2 illustrates a simplified block diagram of a headset and wireless earbud in one example of the invention.

FIG. 2 illustrates a more detailed view of the headset 4 and wireless earbud 6 shown in FIG. 1. Headset 4 may include a headset controller 35 that comprises a processor, memory and software to implement functionality as described herein. The headset controller 35 receives input from the headset user interface and manages an audio signal detected by microphone 34, and manages an audio signal sent to an audio transducer such as speaker 36. The headset controller 35 further interacts with wireless communication transceiver 10 (also referred to herein as a wireless communication module) to transmit and receive signals between the headset 4 and electronic device 2 employing wireless communication transceiver 8. Controller 35 further interacts with magnetic induction transmitter 14 and stereo decoder 20 to transmit audio from headset 4 to wireless earbud 6. In a further example, the wireless communication transceiver 10 may include a controller which controls one or more operations of the headset 4.

Although one example is discussed in reference to a headset 4, other mobile communication devices may be utilized instead of a headset. In one example of the invention, headset 4 is an over-the-ear headset. Headset 4 may be boomless, as the particular category of headset used may vary. Headset 4 includes a wireless communication transceiver 10 for communication with a wireless communication transceiver 8 located in the electronic device 2.

Referring again to FIG. 1, the wireless communication transceivers 8 and 10 can be in the form of a digital wireless transceiver for bi-directional communication. For example, the wireless communication transceivers 8 and 10 can be a transceiver used in known wireless networking devices that operate under the standard of Bluetooth.

Bluetooth is a radio-frequency protocol which allows electronic devices to connect to one another over short-range radio links. Bluetooth devices operate in the ISM (industrial, scientific, medical) band at about 2.4 to 2.5 GHz, and have a range limited to about 10 meters. Spread spectrum frequency hopping limits interference from other devices using the ISM bandwidth. The Bluetooth specification, version 2.0, is hereby incorporated by reference.

A prescribed interface such as Host Control Interface (HCI) is defined between each Bluetooth module. Message packets associated with the HCI are communicated between the Bluetooth modules. Control commands, result information of the control commands, user data information, and other information are also communicated between Bluetooth modules. In operation, electronic device 2 is activated and polls for possible headset devices. Activation and polling may be performed in a manner similar to the Bluetooth Device Discovery Procedure as described in the Bluetooth Specification. A link establishment protocol is then initiated between headset 4 and electronic device 2. The BT Advanced Audio Distribution Profile (A2DP) is used to transmit stereo audio from electronic device 2 to headset 4. A2DP utilizes Audio/Video Control Transport Protocol (AVCTP) for command response messaging, including for example volume control and track selection. A2DP utilizes Audio/Video Distribution Transport Protocol (AVDTP) for transport of audio/video streams.

The wireless communication transceivers 8 and 10 may also, for example, operate under other wireless communication protocols such as DECT or the 802.11a, 802.11b, or related standards. Wireless communication transceivers 8 and 10 may transmit voice, data, or voice and data communications. Wireless communication transceivers 8 and 10 may be configured with a variety of protocols, including a Bluetooth hands-free protocol. Other protocols include, for example, service discovery application, file transfer protocol, and general access profile.

Headset 4 also includes typical components found in a communication headset. For example, headset 4 includes a speaker 36, a microphone 34, a user interface, and status indicator. The user interface may include a multifunction power, volume, stereo/monaural, mute, and select button or buttons. Other user interfaces may be included on the headset, such as a link active/end interface. It will be appreciated that numerous other configurations exist for the user interface. The particular button or buttons and their locations are not critical to the present invention.

The headset 4 includes a boom with the microphone 34 installed at the lower end of the boom. The headset 4 may include a loop attachment to be worn over the user's ear. Alternatively, the main housing of the headset may be in the shape of a loop to be worn behind a user's ear. The headset 4 further includes a power source such as a rechargeable battery installed within the housing to provide power to the various components of the receiver. User speech detected by microphone 34 is transmitted from the headset 4 to electronic device 2 with wireless communication transceiver 10.

Headset 4 and wireless earbud 6 include internal components which are described below in reference to FIGS. 2-5. Referring again to FIG. 2, there is shown a block diagram of a MI communication system that uses magnetic induction fields as a communication link. The MI communication system includes magnetic induction transmitter 14 in a headset 4 and a magnetic induction receiver 16 in a wireless earbud 6. The magnetic induction transmitter 14 includes an audio preamplifier 19, AGC/Limiting pre-emphasis function 21, oscillator 22, amplifier 24, and transmit aerial 26. Wireless earbud 6 includes a magnetic induction receiver 16 and speaker 32. Wireless earbud 6 also includes a power source such as a rechargeable battery and a controller comprising a processor, memory and software to implement functionality as described herein.

In the magnetic induction transmitter 14, the audio preamplifier 19 outputs an amplified audio signal to the AGC/Limiting pre-emphasis function 21, which performs frequency and amplitude shaping of the audio signal. In one example, oscillator 22 is a voltage controlled oscillator. The transmit aerial 26 is typically a small MI aerial having a ferrite core to achieve transmission efficiency. Alternatively, an air core may be used depending upon the operating frequency and desired form factor. The magnetic field generated by transmit aerial 26 provides a carrier that can be modulated by an information signal from, for example, a stereo decoder 20.

Stereo decoder 20 decodes a stereo signal received on wireless communication transceiver 10 into a left audio channel and a right audio channel. Either the left audio channel or right audio channel is sent to the magnetic induction receiver 16 using magnetic induction transmitter 14. The received signal is then output by speaker 32 at earbud 6. The left or right audio channel not transmitted is output at the headset 4 by speaker 36. In one configuration, the user may select whether the earbud receives the left or right channel and whether the headset receives the left or right channel, enabling the user to decide which ear has the mono signal and microphone boom. In a further example of the invention, a stereo decoder may be located at the wireless earbud 6 for decoding a stereo signal received at wireless earbud 6.

An information signal modulated on a MI carrier and transmitted by a distant unit is received via a receive aerial forming part of the magnetic induction receiver 16. A voltage is induced in the receive aerial when it experiences a changing flux. The change may be produced by varying the magnitude or the direction of the incident field. Alternating the magnitude of a flux in a sinusoidal manner induces a sinusoidal voltage in the receive aerial. The receive aerial may also have a ferrite core to achieve efficient reception of the information signal. After the signal is received by the receive aerial it is further processed by the magnetic induction receiver prior to output by speaker 32.

A practical implementation within a headset and wireless earbud are also influenced by the headset and earbud geometry.

Transmit and receive aerials utilize air-cored coils in one example of the invention. These air-cored coils may be pancake shaped. Transmit and receive aerials will operate at 13.56 MHz, although frequency ranges between 1 MHz and 20 MHz may be employed. 13.56 MHz is an internationally approved ISM band for use with plasma cutting equipment and wireless MI linked identification tags. The air-cored coils may be formed of conductive wire, self-adhesive foil, or tracks on a printed circuit board. The shape of the aerial may be altered to conform to the physical shape of the package. The loop may be formed at the time of installation.

Figure 3:
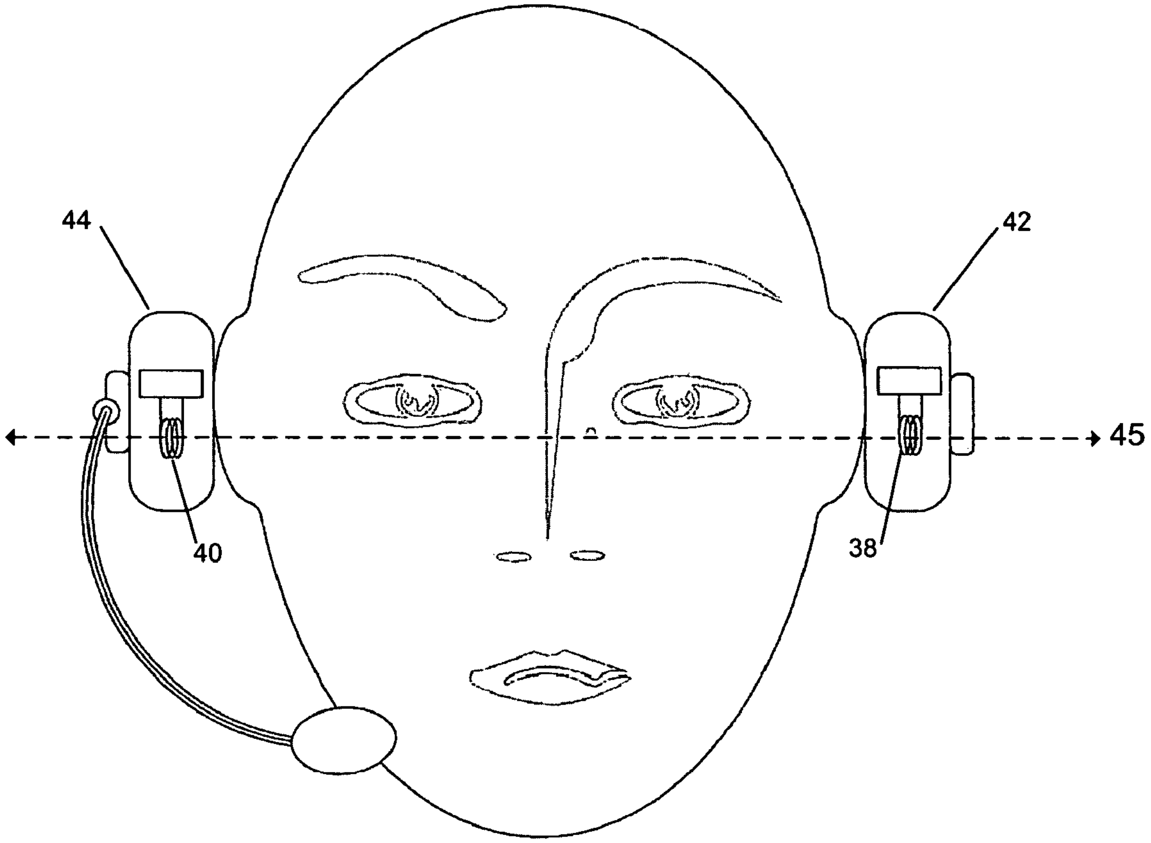
FIG. 3 illustrates a magnetic induction transmitter in a headset and a magnetic induction receiver in a wireless earbud.
Figure 8:
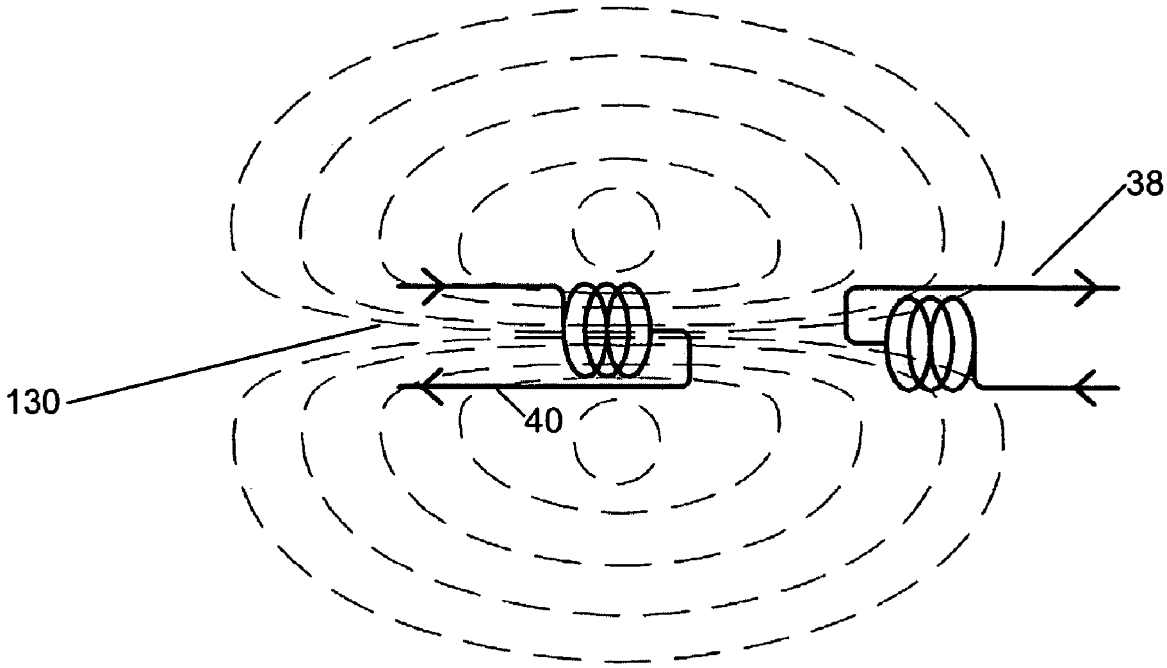
FIG. 8 illustrates coupling between a magnetic induction transmitter and a magnetic induction receiver.

Referring to FIG. 3, there is shown a front view of one embodiment of a horizontal field configuration of aerials in accordance with the present invention. The configuration includes an air core loop aerial 40 in a headset 44 and an air core loop aerial 38 in an earbud 42. The loop aerial 40 and loop aerial 38 are axially aligned along an axis 45 to provide maximum coupling between the aerials. Due to the alignment of a user's ears, axial alignment of the loop aerial 40 and loop aerial 38 is easily achieved to provide maximum coupling when the headset and earbud are worn. The axially aligned loop aerial 40 and loop aerial 38 may be rotated about axis 45 without affecting coupling, allowing for flexible wearing of the earbud and headset. In a further example, loop aerial 40 and loop aerial 38 may be rotated by ninety degrees (i.e., radially aligned) or tilted to direct the magnetic fields, and sufficient coupling will exist. Referring to FIG. 8, the loop aerial 40 generates magnetic flux lines defined by a magnetic flux vector 130 ("H") that extends through the center of the loop aerial 40. As shown in FIG. 8, the magnetic flux lines generated by the loop aerial 40 close on themselves and link with loop aerial 38 to induce a signal in loop aerial 38.

Figure 4:
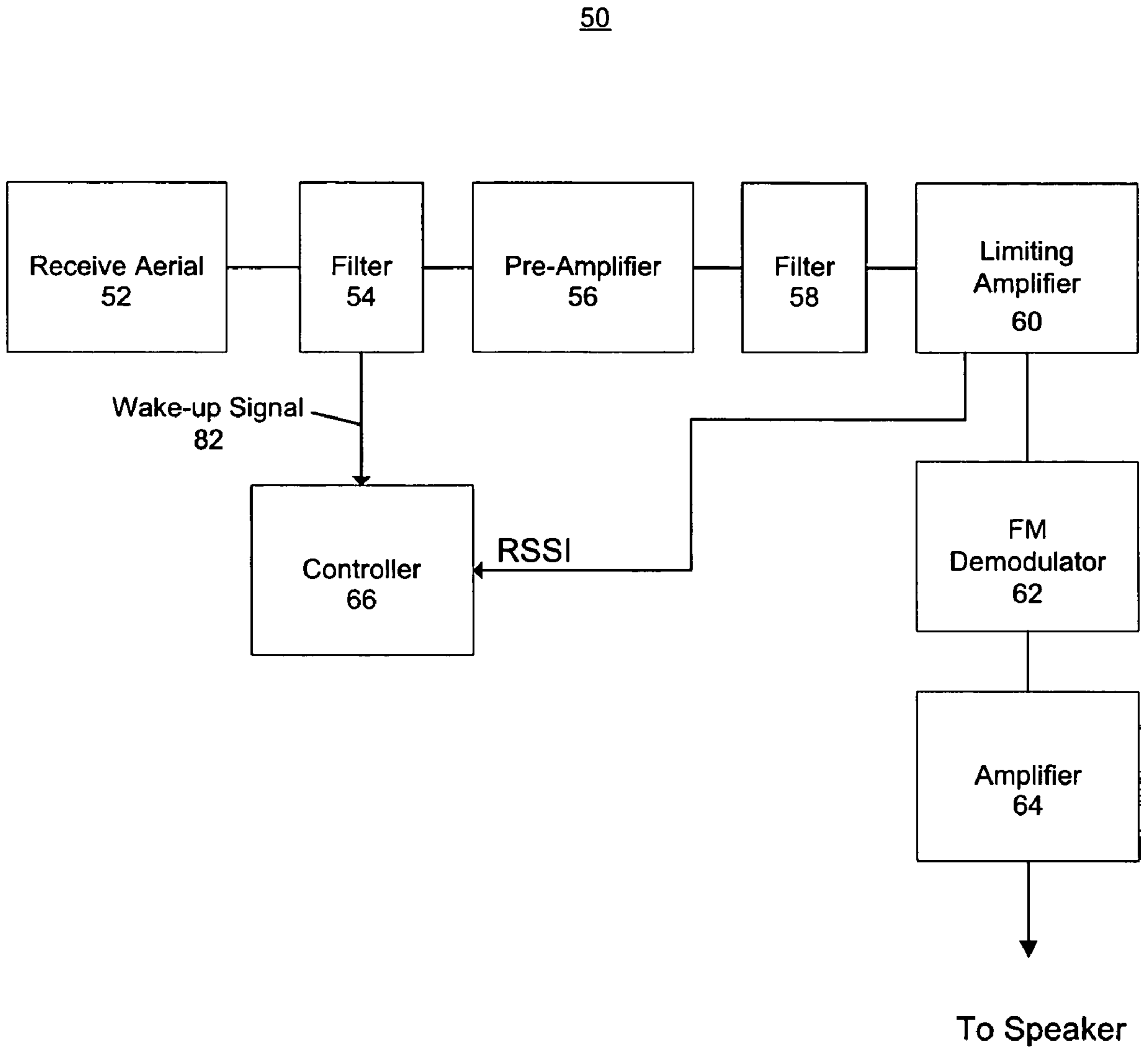
FIG. 4 illustrates simplified block diagram of a receive circuit in an earbud in one example of the invention.

Referring to FIG. 4, there is shown a block diagram illustrating a receive circuit 50 for a magnetic induction receiver in accordance with one example. The receive circuit 50 includes a receive aerial 52, filter 54, pre-amplifier 56, filter 58, limiting amplifier 60, FM demodulator 62, amplifier 64, and controller 66. Filter 54 removes unwanted interfering signals detected by the receive aerial 52, including WiFi signals or radio signals. For example, filter 54 may be a capacitor across the output of the receive aerial 52. The pre-amplifier 56 is a conventional preamplifier.

One advantage of the invention is that the wireless earbud 6 does not require an on or off user interface to activate or deactivate the wireless earbud. If wireless earbud 6 is brought within close range to the magnetic induction transmitter, a voltage induced in the receive aerial 52 generates an activate/wake up signal which is passed to controller 66. To power the earbud up, it would only be necessary to touch the earbud to the headset or bring the earbud within range of less than approximately 3 inches. As the magnetic field strength is so dependent on separation distance, very small separation distances result in very high coupling. The receive signal at very small distances would be sufficient to turn on a silicon diode rectifier or a bipolar junction transistor (>0.7V) and so power up the earbud from a zero power state. The voltage generated may be in the magnitude of volts. Controller 66 then activates the wireless earbud 6. In one example, the activate current is passed through a diode in filter 54. Once powered, the carrier strength is monitored and once it falls below a predetermined threshold for a pre determined period, the earbud powers off again.

Another advantage of the invention is that the wireless earbud 6 may power down or go into "sleep mode" automatically to conserve battery power upon loss of its MI carrier for a period of time. The controller 66 receives and monitors a receiver signal strength indicator (RSSI) associated with the transmission of an audio signal from the headset to the wireless earbud. If the RSSI drops below a predetermined threshold level, the controller 66 places the wireless earbud 6 in sleep modes or initiate a timer after which a predetermined time expires activate sleep mode. In one example, the RSSI signal is output from limiting amplifier 60 to controller 66.

Figure 5:
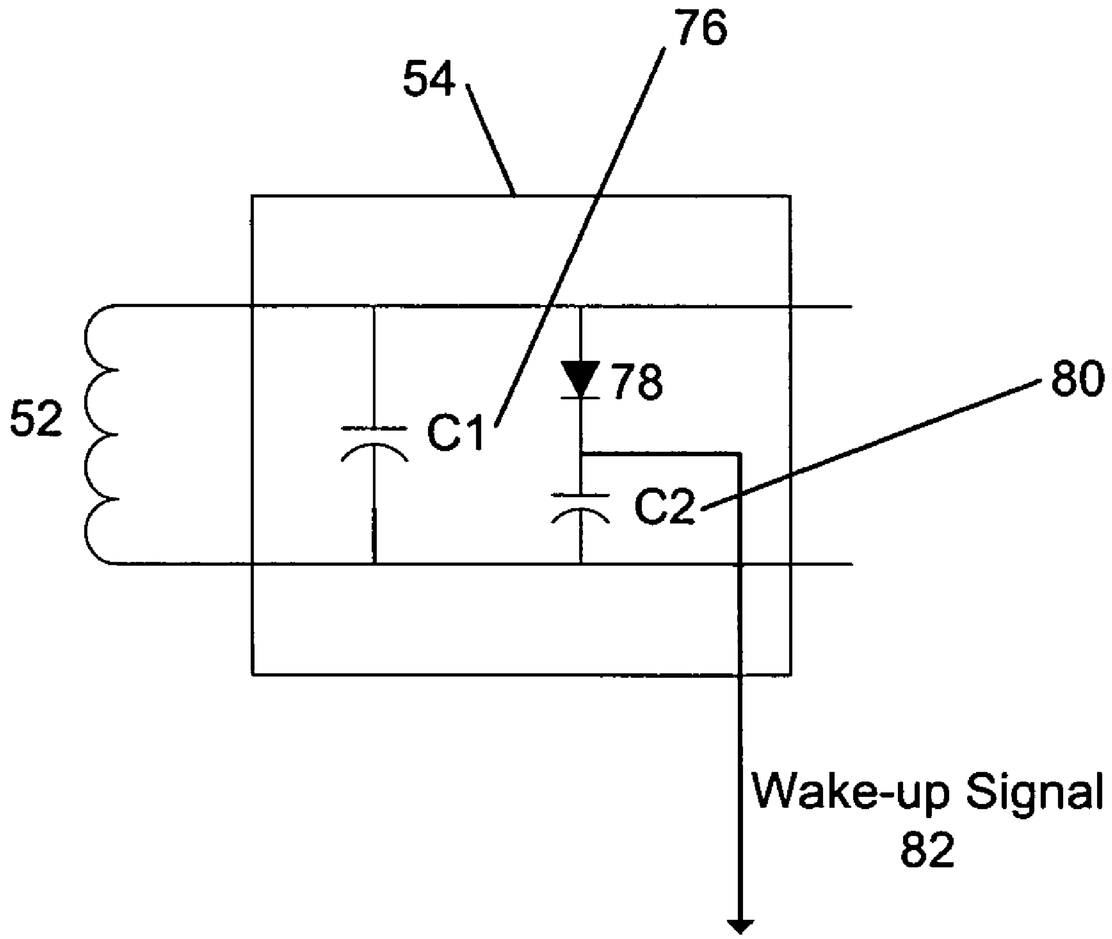
FIG. 5 illustrates a simplified receiver circuit filter in one example of the invention.

Referring to FIG. 5, there is shown a more detailed view of filter 54 from FIG. 4. A capacitor C1 76 is located across the output of a receive aerial 52 creating a tuned circuit and hence filtering interference in the receive signal. A diode 78 and capacitor C2 80 are in parallel to capacitor C1 76 to rectify large receive signals and hence provide a DC signal 82 that is output to controller 66. This signal is used to wake-up the controller from a sleep, or low power state.

Figure 6:
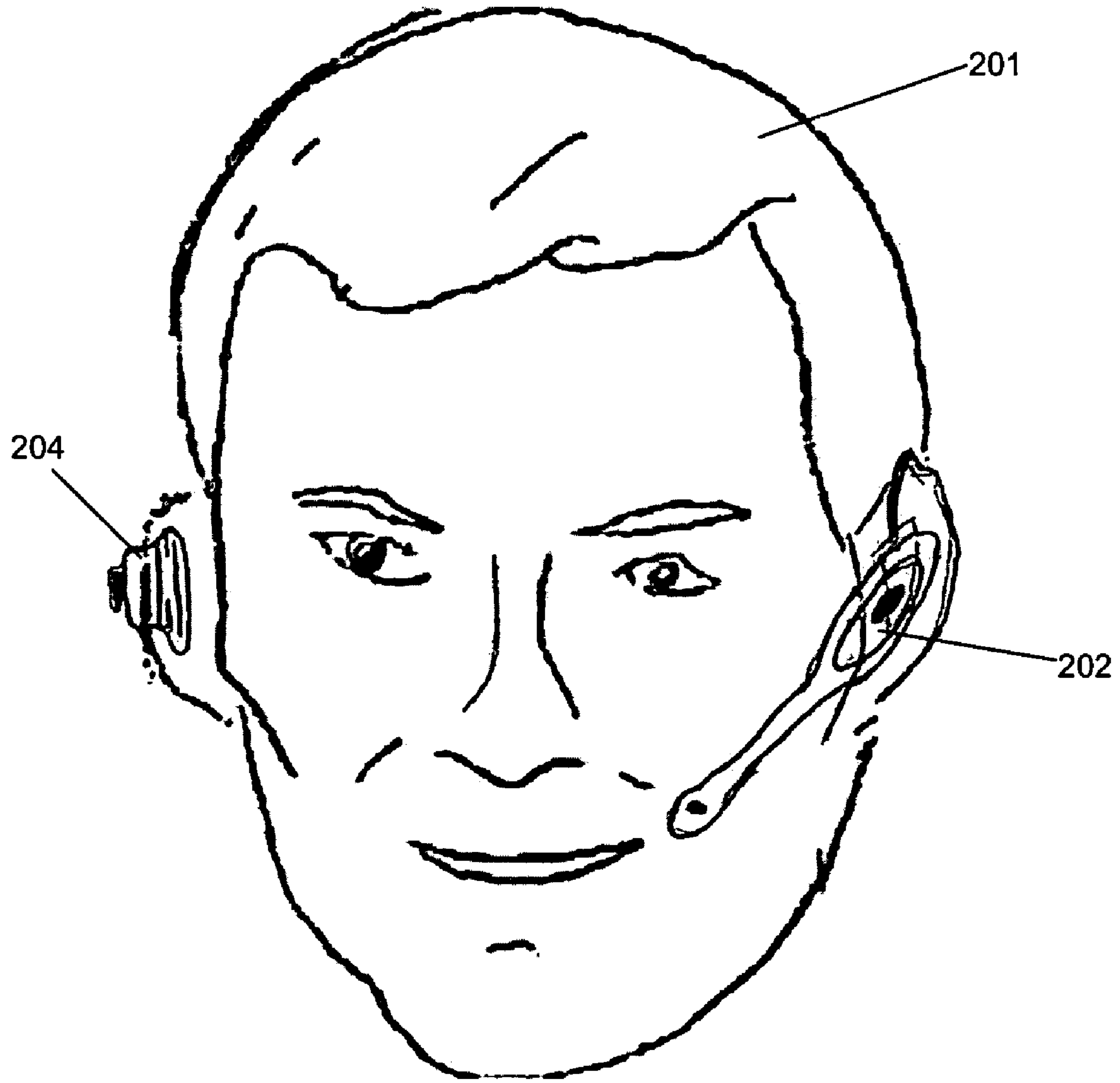
FIG. 6 illustrates a wireless stereo headset system worn by a user in one example of the invention.

FIG. 6 illustrates a wireless stereo headset worn by a user 201 in an example of the invention. An over-the-ear headset 202 is capable of monaural telephone communications or stereo listening. As shown in FIG. 6, headset 202 is shown in a stereo listening mode with a wireless earbud 204 outputting one channel of the stereo signal.

Figure 7:
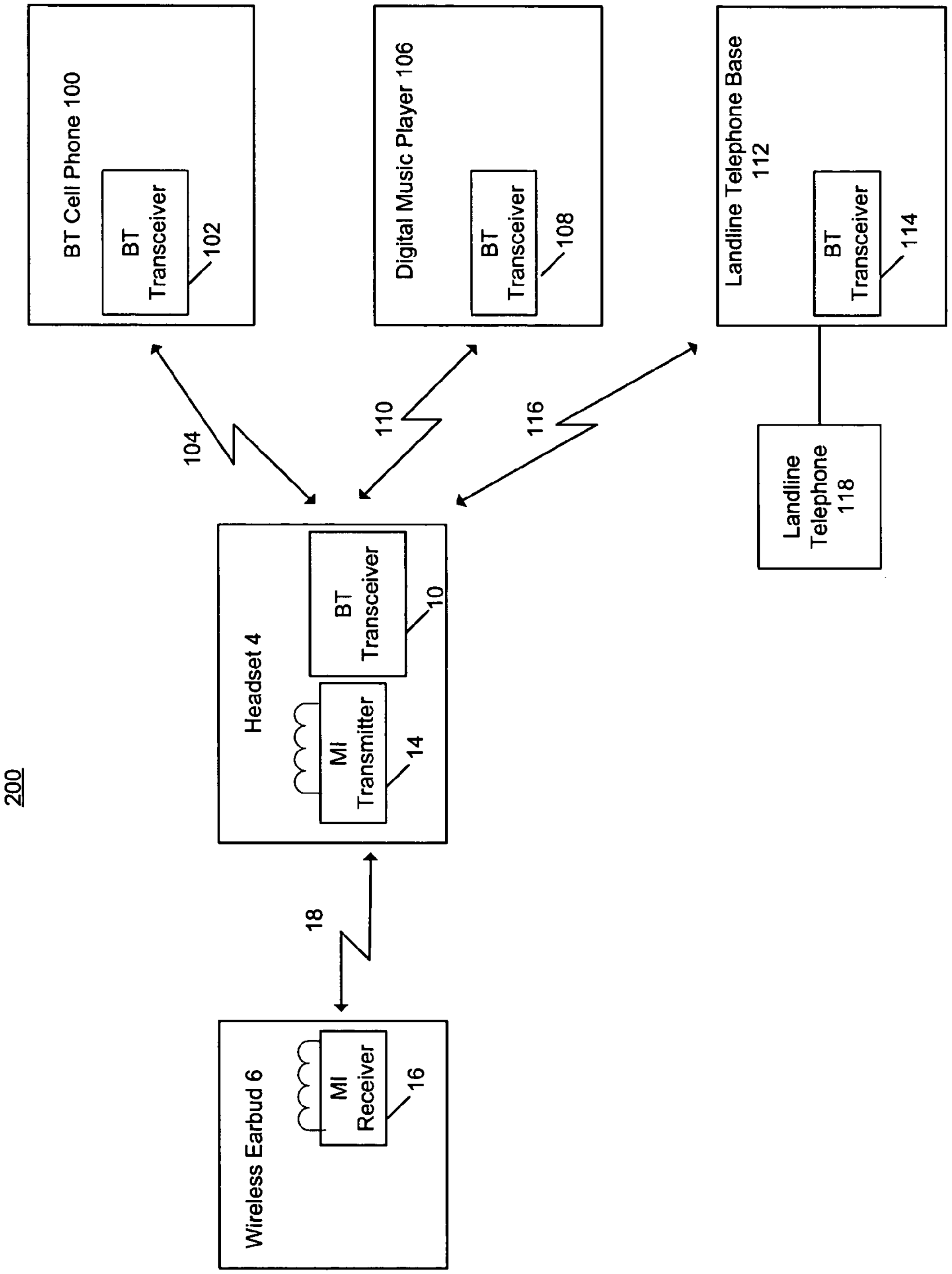
FIG. 7 illustrates a system view of a further example of a wireless stereo headset system in one example of the invention.

FIG. 7 illustrates a system 200 of a further example of the present invention. Although FIG. 7 illustrates a headset 4 used with three possible host electronic devices, fewer or greater electronic devices may be used.

A headset 4 is in proximity to a Bluetooth enabled cellular telephone 100, digital music player 106, and landline telephone base 112. Headset 4 includes a Bluetooth transceiver 10 capable of communication with Bluetooth enabled cellular telephone 100, digital music player 106, and landline telephone base 112. Landline telephone base 112 is coupled to a landline telephone 118. Although system 200 is illustrated using Bluetooth between headset 4 and cellular telephone 100, digital music player 106, and landline telephone base 112, other wireless communication standards may be used in further examples, including IEEE 802.11.

Bluetooth enabled cellular telephone 100 includes a Bluetooth transceiver 102 for communication with headset 4 over a wireless communication link 104. Digital music player 106 includes a Bluetooth transceiver 108 for communication with headset 4 over a wireless communication link 110. Landline telephone base 112 includes a Bluetooth transceiver 114 for communication with headset 4 over a wireless communication link 116. A headset 4 user may switch between cellular telephone 100, digital music player 106, and landline telephone base 112.

When stereo listening operation is desired by a user, a wireless earbud 6 is used in conjunction with headset 4. Both headset 4 and wireless earbud 6 have wireless communication functionality to form a wireless communication link 18. In one example of the invention, wireless communication link 18 is implemented using magnetic induction. Headset 4 includes a magnetic induction transmitter 14 and wireless earbud 6 includes a magnetic induction receiver 16.

The present invention allows for a variety of usage modes. The headset may be used as a conventional telecommunications headset without the earbud when the user merely wishes to receive and make calls on an electronic device such as a cell phone 100 or landline telephone 118.

The headset 4 may be used in conjunction with the earbud 6 for stereo listening from a cellular telephone 100, digital music player 106, or other electronic device. In operation, the headset may be switched from stereo to monaural mode when an incoming call is received on Bluetooth cellular telephone 100 or landline telephone 118. When switching between modes of operation, the user either removes or inserts the wireless earbud. For example, a user listening to music from a digital music player 106 will have the music interrupted when an incoming call is received on cellular telephone 100. The user may then remove the wireless earbud 6. Switching may be implemented automatically by the headset controller at headset 4 upon signaling by the cellular telephone or digital music player.

In a further example of the invention, wireless earbud 6 may receive a stereo audio signal or a component of a stereo audio signal from an electronic device 2 rather than from headset 4. In such an example, both wireless earbud 6 and headset 4 have a wireless communication link (e.g., Bluetooth or IEEE 802.11) with the electronic device. Both the headset 4 and wireless earbud 6 output one channel of the stereo signal. In one example, the BT A2DP profile is used to implement a proprietary system for time stamping, buffering, and synchronizing the audio stream.

The headset system described herein may have additional features. For example, wireless earbud 6 may employ a sleep function. If the headset 4 is not within range for a predetermined time, wireless earbud 6 is powered down. A push button user interface powers the wireless earbud 6 up or, after a prolonged depression, powers down.

The headset system may further include a charger/carrier, such as a pocket charger, including a small plastic storage case for storing the headset 4 and wireless earbud 6 for protection and charging. The pocket charger includes a battery and charger circuit for charging both the headset battery and wireless earbud battery when inserted into the pocket charger/carrier. The use of a pocket charger/carrier provides a convenient mechanism by which the earbud 6, having a relatively smaller capacity battery due to its limited size, may be recharged in the absence of a primary charger.

In a further example, the charger/carrier utilizes a charging coil to provide charging current to the wireless earbud battery 84 via receive aerial 52 shown in FIG. 4. The earbud advantageously does not require charging contacts on its small exterior surface when charging is performed with inductive charging. In this example, the single receive aerial 52 functions multiply to receive charging power for battery 84, generate a wake up signal 82, or receive an audio signal carrier. An on/off user interface and charging contacts are therefore not required on the wireless earbud. In a further example, the charging coil of the charger/carrier is used to charge the battery of the headset as well. Inductive charging systems are discussed in the patent application "Inductive Charging System", application Ser. No. 10/882,961, filed Jul. 1, 2004 and assigned to the present applicant Plantronics, Inc., which is hereby incorporated by reference.

The headset system may further include a primary charger to which the pocket charger may be removably attached. The primary charger may be a cable or docking facility connecting the pocket charger/carrier to a wall outlet or primary batter such as a car battery, allowing the headset battery, wireless earbud battery, and the storage case battery to be charged using the wall outlet or primary battery.

The various examples described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such changes may include, but are not necessarily limited to: the wireless communication technology or standards to perform the link between the headset and wireless earbud; components of the magnetic induction transmitter and receiver circuits; the wireless communication technology or standards to perform the link between the electronic device and the headset; components of the magnetic induction system, including the type and orientation of transmitter and receiver coils; types of electronic devices; number, placement, and functions performed by the user interface. Furthermore, the shapes and sizes of the illustrated headset and wireless earbud housing and components may be altered. Such modifications and changes do not depart from the true spirit and scope of the present invention that is set forth in the following claims.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A stereo headset system comprising:
- a first wireless component comprising:
  - a first speaker;
  - a microphone;
  - a first wireless communication module;
  - a first wireless component housing;
  - a second wireless communication module comprising a magnetic induction transmitter, the magnetic induction transmitter comprising a transmit loop aerial disposed within the first wireless component housing at a first orientation; and
- a second wireless component comprising:
  - a second wireless component housing;
  - a second speaker; and
  - a third wireless communication module comprising a magnetic induction receiver for receiving an audio signal from the second wireless communication module during stereo mode operation, the magnetic induction receiver comprising a receive loop aerial disposed within the second wireless component housing at a second orientation matching the first orientation, wherein the transmit loop aerial and receive loop aerial are axially aligned during stereo mode operation.

2. The stereo headset system of claim 1, wherein the first wireless communication module utilizes the Bluetooth standard.

3. The stereo headset system of claim 1, wherein the first wireless communication module utilizes the IEEE 802.11 standard.

4. The stereo headset system of claim 1, wherein the magnetic induction transmitter and the magnetic induction receiver operate at a frequency range between 1 MHz and 20 MHz.

5. The stereo headset system of claim 4, wherein the magnetic induction transmitter and the magnetic induction receiver operate at a frequency of 13.56 MHz.

6. The stereo headset system of claim 1, wherein the magnetic induction transmitter and the magnetic induction receiver utilize air-cored coils.

7. The stereo headset system of claim 1, wherein the second wireless component is activated when the first wireless component is brought within three inches or contacted with the second wireless component.

8. The stereo headset system of claim 1, wherein the second wireless component further comprises a battery and the magnetic induction receiver receives charging current for the battery from an inductive charger.

9. A headset system comprising:
- an electronic device capable of outputting a monaural or a stereo audio signal;
- a first headset component for receiving the monoaural or the stereo signal from the electronic device comprising:
  - a first headset component housing;
  - a magnetic induction transmitter comprising a transmit loop aerial disposed within the first headset component housing at a first orientation; and
- a second headset component capable of wireless communications with the first headset component utilizing magnetic induction communication, wherein the second headset component receives the stereo signal or a component of the stereo signal from the first headset component, the second headset component comprising:
  - a second headset component housing; and
  - a magnetic induction receiver comprising a receive loop aerial disposed within the second headset component housing at a second orientation matching the first orientation, wherein the transmit loop aerial and receive loop aerial are axially aligned when the second headset component receives the stereo signal or a component of the stereo signal from the first headset component.

10. The headset system of claim 9, wherein the electronic device comprises a cellular telephone or digital music player.

11. The headset system of claim 10, wherein the magnetic induction communication operates at a frequency range between 1 MHz and 20 MHz.

12. The headset system of claim 10, wherein the magnetic induction communication operate at a frequency of 13.56 MHz.

13. A method for using a headset system comprising:
- generating a power-on activation or wake-up signal in a second headset component by touching the second headset component with a first headset component or bringing the second headset component within a range of approximately 3 inches or less from the first headset component;
- powering up the second headset component using a second headset component controller responsive to the power-on activation or wake-up signal;
- receiving a stereo audio signal at the first headset component;
- decoding the stereo audio signal into a first audio channel and a second audio channel, wherein the first audio channel is output by a first speaker at the first headset component; and
- transmitting the second audio channel to the second headset component over a wireless link, wherein the second audio channel is output by a second speaker at the second headset component.

14. The method of claim 13, wherein the wireless link comprises a magnetic induction link between a magnetic induction transmitter and a magnetic induction receiver.

15. The method of claim 13, wherein the power-on activation or wake-up signal is generated responsive to a voltage induced in a receive aerial in the second headset component.

16. The method of claim 13, further comprising powering down the second headset component if a magnetic induction carrier falls below a threshold level for a pre-determined period of time.

17. A headset system comprising
- a first headset component comprising:
  - a first headset component housing;

a magnetic induction transmitter comprising a transmit loop aerial disposed within the first headset component housing; and a second headset component comprising:

a second headset component housing; and a magnetic induction receiver comprising a receive loop aerial disposed within the second headset component housing, the magnetic induction receiver adapted to receive a signal from the magnetic induction transmitter and the receive loop aerial being so arranged as to align with the transmit loop aerial to receive the signal wherein a first audio channel is output at the first headset component and a second audio channel received from the first headset component is output at the second headset component.

18. The headset system of claim 17, wherein the magnetic induction transmitter and the magnetic induction receiver operate at a frequency range between 1 MHz and 20 MHz.

19. The headset system of claim 17, wherein the magnetic induction transmitter and the magnetic induction receiver utilize air-cored coils.

20. The headset system of claim 17, wherein the second headset component is activated when brought within close proximity to the first headset component.

* * * * *

UNITED STATES PATENT AND TRADEMARK OFFICE

CERTIFICATE OF CORRECTION

PATENT NO. : 7,627,289 B2
APPLICATION NO. : 11/317984
DATED : December 1, 2009
INVENTOR(S) : David Huddart It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 860 days.

Signed and Sealed this

Second Day of November, 2010

David J. Kappos
*Director of the United States Patent and Trademark Office*